3,193,517
LATEX BASES FOR INTERIOR PAINTS
Ezekiel Melvin Gindler, Valencia, and William N. Maclay, Monroeville, Pa., assignors to Koppers Company, Inc., a corporation of Delaware
No Drawing. Filed Dec. 3, 1962, Ser. No. 241,552
4 Claims. (Cl. 260—29.7)

This invention relates to a latex which imparts improved properties to water based interior paints. In one specific aspect it relates to a high styrene-low butadiene latex prepared in the presence of a novel emulsifier combination.

Latex paints have recently become very popular for interior wall finishes. These are preferred by the "do-it-yourself" homemaker over alkyd paints because of their ease of application, rapid drying speed, ease of clean up, and ease of stain removal. However, numerous complex problems still exist in the preparation of the latex paint base. For instance, the viscosity of the latex paint changes with aging, possibly, as a result of the latex emulsion reacting with the other ingredients contained in the paint. Other problems encountered include coagulation of the latex during emulsion polymerization, and coagulation of the final latex paint as a result of temperature changes, i.e., freeze-thaw instability.

Quite surprisingly, we have discovered a method of making improved latex bases for use in interior paints by polymerizing in the presence of a novel emulsifier combination. Paints prepared using the improved latex bases are viscosity stable, have a high scrub resistance, and are freeze-thaw stable.

It is, therefore, an object of the present invention to provide a latex for use in interior paint formulations which imparts improved properties to the final product.

In accordance with the present invention we have discovered a method of making a viscosity stable latex for interior paints having high scrub resistance which comprises emulsion polymerizing a terpolymer of 50–75 parts by weight of a vinyl aryl monomer with correspondingly 50–25 parts of a conjugated diolefin and 0.25–2.0 parts of an unsaturated acid. The latex is polymerized in an aqueous emulsion in the presence of 0.15–1.0 part of a water soluble salt of persulfuric acid and a novel emulsifier combination consisting of 1.2–4.8 parts of a polyethoxylated quaternary ammonium chloride derived from coco fatty amine, 0.8–3.2 parts of N-coco-beta-aminobutyric acid, 0.5–1.6 parts of a polyethoxylated octyl phenol, and 0.8–3.2 parts of a block copolymer prepared by the sequential addition of propylene oxide and ethylene oxide to ethylene diamine.

Suitable vinyl aryl monomers include: styrene, vinyl toluenes, ethylstyrenes, dimethylstyrene, divinylbenzene, alpha-methylstyrene, p-methoxystyrene, p-chlorostyrene, 2,4-dichlorostyrene, 2,5-dichlorostyrene, p-bromostyrene, alpha-methyl-p-methylstyrene, p-isopropylstyrene, vinyl naphthalene, and the like. Mixtures of two or more such compounds may be used if desired.

Suitable conjugated diolefins include butadiene-1,3, 2-methyl butadiene-1,3- (isoprene), 2-chlorobutadiene-1,3 (chloroprene), piperylene, and 2,3-dimethylbutadiene-1,3.

Suitable unsaturated acids include acrylic acid and its homologues, such as methacrylic acid and ethacrylic acid. Alpha-methylene dicarboxylic acids, such as itaconic acid, and their monoesters are particularly suitable. We have found that the higher carboxyl content of itaconic acid over other unsaturated acids and its unique beta-carboxyl group make it especially desirable in producing the improved later.

The latex of the present invention is produced by interpolymerizing the foregoing components within a specific range of proportions. The vinyl aryl monomer content should comprise from 50–75 percent by weight of the total monomers, in which about 65 percent is preferred. The conjugated diolefin should comprise from 50–25 percent by weight of the total monomer, in which about 35 percent is preferred. If the percent of conjugated diolefin is increased above 50 percent, the film produced is too soft and tacky. On the other hand, if the vinyl aryl monomer is increased above 75 percent, the film becomes too hard and brittle. The unsaturated acid content should comprise by weight from 0.25–2.0 percent of the total monomer, the preferred amount being about 0.4 percent. Using less than the minimum amount of unsaturated acid results in the formation of a latex having unsatisfactory mechanical stability, which is determined by the formation of coagulation during mixing or other mechanical agitation. Using more than the maximum amount of unsaturated acid set forth above results in decreased conversion of the latex to below the acceptable range of 96–100 percent and reduced scrub resistance of the finished latex paint.

The latex is prepared in the presence of a novel four component emulsifier combination. The components may be classified as cationic, amphoteric and nonionic. The amphoteric emulsifier, while capable of being an acid or base, is cationic at the pH of the solution during polymerization. Each of the components, in the quantities set forth below, must be present during emulsion polymerization to prepare the improved latex base.

The latex formulation must contain between 1.2 to 4.8 parts per hundred parts of monomers of a cationic surface active agent formed by the addition of methyl chloride to a polyethoxylated fatty amine. This class of compounds has the formula:

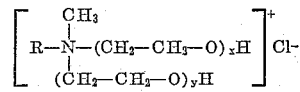

wherein R is derived from natural coconut fatty acids (i.e., a mixture of myristic, lauric, palmitic, and stearic acids) and $x$ and $y$ are integers the sum of which is about 15. A representative compound is sold commercially by Armour and Company under the trademark "Ethoquad C/25."

The amphoteric surface active agent must be present in an amount between 0.4–1.8 parts per hundred parts of monomers. It is prepared by the reaction of primary coco amine and crotonic acid which may be represented by the formula:

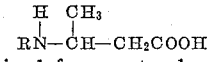

wherein R is derived from natural coconut fatty acids. During the polymerization step, which is conducted under acidic conditions, the emulsifier is cationic. A representative compound is sold commercially by Armour and Company under the trademark "Armeen Z."

The remaining components of the emulsifier combination are nonionic surface active agents. The formulation must contain from 0.4–1.6 parts per hundred parts of monomer of a polyethoxylated octyl phenol represented by the formula.

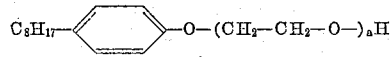

wherein $a$ is an integer having a value of 9–10. A representative compound is sold commercially by the Rohm and Haas Company under the trademark "Triton X–100." Also required in the formulation are from 0.8 to 3.2 parts per hundred parts of monomers of a block copolymer prepared by the sequential addition of propylene oxide and ethylene oxide to ethylene diamine. These block copolymers have a molecular weight as high as about 27,000–30,000 and are represented by the formula:

$$H(C_2H_4O)_m(C_3H_6O)_n\diagdown\ \diagup(C_3H_6O)_n(C_2H_4O)_mH$$
$$NC_2H_4N$$
$$H(C_2H_4O)_m(C_3H_6O)_n\diagup\ \diagdown(C_3H_6O)_n(C_2H_4O)_mH$$

A representative compound of this type is sold commercially by the Wyandotte Chemical Company under the trademark "Tetronics 908."

The preferred catalysts for the emulsion polymerization are the water soluble salts of persulfuric acid, such as potassium persulfate, sodium persulfate, and ammonium persulfate. Other useful catalysts may also be used and include hydrogen peroxide, benzoyl peroxide, lauroyl peroxide, di-t-butyl peroxide and azobisobutyronitrile. The amount of catalyst required falls within a range of about 0.10–2.0 parts per hundred parts of monomers, preferably about 0.25–0.50 part. Mixed catalysts such as 0.15 part of potassium persulfate and 1.0 part of 35 percent hydrogen peroxide are also effective. We have found it desirable to add the catalyst to the reactor in increments, whereby for example, half of the catalyst charge is added initially and the remainder is divided into three portions which are added during the final stages of polymerization.

The total amount of water used may be varied according to the solids content desired in the final latex. It is generally preferred to use a ratio of water to monomer, such that a latex having a total solids content, i.e., copolymer, surfactants and electrolytes, of from 40–65 percent is produced. The preferred range of solids is from 48–55 percent.

The polymerization is carried out in an aqueous system at a pH in the acid range, preferably, at a pH of 2.0–4.0. After preparation, it is desirable to raise the pH of the latex to 8–10. This may be done using inorganic or organic bases such as sodium hydroxide, ammonium hydroxide, potassium hydroxide, sodium carbonate, potassium carbonate, monoethanolamine and the like.

In the polymerization process, the charges are added to a suitable reaction vessel which is then purged with nitrogen gas. The temperature is adjusted to a conventional polymerization temperature, such as between 50 and 100° C., and preferably to a temperature between 70 and 80° C. The polymerization is conducted under autogenous pressure in a closed system.

It is necessary, in order to obtain the improved latex base, that the polymerization mixture contain sufficient amounts of electrolytes. Although some water soluble salts are already present in the system as impurities or as catalyst, it may be desirable to include additional amounts of electrolytes. Useful water soluble inorganic salts include the alkali metal halides or sulfates and the alkaline earth metal halides or sulfates, such as sodium chloride, potassium chloride, calcium chloride, zinc chloride, sodium sulfate, potassium sulfate, sodium bromide, potassium bromide, and the like.

Our invention is further illustrated by the following examples.

EXAMPLE I

An aqueous emulsion of a monomeric mixture was prepared according to the following formulation:

| Ingredients | Parts by weight |
| --- | --- |
| Styrene | 65 |
| Butadiene | 35 |
| Itaconic acid | 0.40 |
| Water | 100 |
| Surfactant A [1] | 2.4 |
| Surfactant B [2] | 1.6 |
| Surfactant C [3] | 0.8 |
| Surfactant D [4] | 1.5 |
| Potassium chloride | 1.0 |
| Potassium persulfate | 0.30 |

[1] A polyethoxylated quaternary ammonium chloride derived from coco fatty amine.
[2] N-coco-beta-aminobutyric acid (55% active).
[3] A polyethoxylated octyl phenol.
[4] A block copolymer prepared by the sequential addition of propylene and ethylene oxides to ethylene diamine.

A 100 gallon reactor equipped with agitator was charged with 100 parts of water, 0.40 part of itaconic acid, 2.4 parts of Surfactant A, 1.6 parts of Surfactant B, 0.8 part of Surfactant C, 1.5 parts of Surfactant D, 1.0 part of potassium chloride and 0.15 part of potassium persulfate. After purging the reactor with nitrogen, a mixture of 65 parts of styrene and 35 parts of butadiene were added under constant agitation. The reactor was heated initially to 50° C.; then the temperature was gradually raised to 75° C. over a period of 2 hours; and finally the temperature was maintained at 75° C. for the remainder of the reaction. The remainder of the catalyst was added in three 0.05 part increments after six, seven, and eight hours of reaction time.

The polymerization was terminated after nine hours; and the reactor was vented and cooled to 65° C. After raising the pH to 9.5 with a 50 percent solution of monoethanol amine, the latex was steam stripped to remove unreacted monomers.

The stripped latex product had the following properties:

| | |
| --- | --- |
| Solids, percent | 48.0 |
| pH | 9.5 |
| Viscosity, cps. | 210 |
| Surface tension, dynes/cm. | 43 |
| Mechanical stability | Good |
| Calcium chloride stability | Good |

EXAMPLE II

The procedure of Example I was followed and the formulation set forth therein was used except that the emulsifier system was changed to include only the two components set forth below:

| Ingredient | Parts by weight |
| --- | --- |
| Sodium docedyl benzene sulfonate | 1.75 |
| Surfactant C [1] | 0.80 |

[1] See Note 3 in Example I.

EXAMPLES III–IV

The procedure of Example I was followed and the formulation set forth therein was used except that the emulsifier system was changed as follows:

| Ingredients | Example III | Example IV |
| --- | --- | --- |
| Surfactant A [1] | Present | Present. |
| Surfactant B [2] | do | Do. |
| Surfactant C [3] | Omitted | Do. |
| Surfactant D [4] | do | Omitted. |

See Notes 1–4 in Example I.

The latex prepared in Example III was unacceptable because a long induction period (5 hours) was required and large amounts of coagulum were formed on the reactor walls.

The latex prepared in Example IV was unacceptable because, although the addition of Surfactant C reduced the induction period, large amounts of coagulum (11%) were formed on the reactor wall.

EXAMPLE V

An interior paint paste was prepared for use with latex bases according to the following formulation:

| Ingredients | Parts by weight |
| --- | --- |
| Titanium dioxide | 532 |
| Calcium carbonate | 150 |
| Aluminum-silica pigment | 60 |
| Potassium pyrophosphate | 2 |
| Lecithin | 7.6 |
| Casein (15% aqueous solution) | 200 |
| Fungicide | 2.8 |
| Defoamer | 2.8 |
| Water | 522 |
| Pigment volume concentration | 33 |
| Paste/latex (48%) ratio | 2/1 |

Finished paint was thickened with 3 parts of 2.5 percent synthetic thickener (4000 cps.) solution per 39 parts of paint.

A series of paints was prepared with this paste using the latexes prepared in Example I, Example II and a commercial latex. The paints were subjected to a four day scrub test as determined by a Gardner Washability Machine. The results are given in table below.

*Scrub tests on latex paints using above formulation*

| Latex base: | Scrub cycles |
|---|---|
| Latex Ex. I | >5000 |
| Latex Ex. II | 546 |
| Commercial latex[5] | 1731 |

[5] A 67% styrene–33% butadiene emulsion copolymer paint latex.

EXAMPLE VI

The changes in viscosity of the finished paints prepared according to Example V containing the commercial latex and the latex prepared according to Example I were compared to determine the effect of aging.

| Latex | Initial | Viscosity at 25° C. in Krebs units after aging at room temperature ||||||| 
|---|---|---|---|---|---|---|---|---|
| | | 1 day | 4 days | 5 days | 8 days | 13 days | 83 days | 313 days |
| Commercial latex [1] | 68 | 93 | 107 | 108 | 113 | 117 | 130 | 136 |
| Latex Ex. I | 66 | 71 | 73 | 74 | 74 | 74 | 100 | 103 |

[1] See Note 5 in Example V.

Comparing the viscosity stabilities of these paints, it is noted that the paint containing the latex prepared according to Example I is more stable than the paint containing the commercial latex although after 83 days both paints showed a sharp increase in viscosity.

EXAMPLE VII

A latex paint (paste of Example V and vehicle of Example I) was prepared and tested for freeze-thaw stability. The paint was subjected to five freeze-thaw cycles and the effect on the paint noted. Each cycle involved freezing eight ounces of paint at a temperature of 10°±3° F. for 16 hours and then gradually letting the paint thaw at room temperature. After mixing the paint thoroughly, films were cast with a 3 mil and a 6 mil applicator and the appearances were noted. In addition, the viscosity of the paint was recorded.

| | Viscosity | Appearance |
|---|---|---|
| Initial | 65 | Acceptable. |
| First cycle | 69 | Do. |
| Second cycle | 71 | Do. |
| Third cycle | 72 | Do. |
| Fourth cycle | 71 | Do. |
| Fifth cycle | 70 | Do. |

EXAMPLE VIII

An interior paint was prepared using the paint paste set forth below and the vehicle of Example I.

| Ingredients | Parts by weight |
|---|---|
| Sulfonated tallow | 20 |
| Water | 560 |
| Na₄P₂O₇ sodium pyrophosphate | 8 |
| Dispersant | 10 |
| Lithopone | 200 |
| Titanium dioxide | 960 |
| Water ground mica | 80 |
| Dry ground mica | 80 |
| Calcium carbonate | 140 |
| Diatomaceous earth | 60 |
| Kaolin | 200 |
| Carboxymethyl cellulose | 2.0 |

Vegetable protein dispersion for thickening this formulation was prepared by the procedure outlined below.

(1) 410 parts water was heated to 80° C. in a suitably sized container equipped with heating and agitation means and a cover.

(2) 55 parts of Drackett soya bean protein was added and stirred 5 minutes at 80° C.

(3) 6.5 parts sodium orthophenyl phenate and 6.5 parts sodium pentachlorophenate were stirred into the slurry for five minutes at 80° C.

(4) 2.3 parts sodium hydroxide pellets in 15.0 parts water were added and stirring continued for an additional ten minutes at 80° C.

(5) 4.6 parts H₃BO₃ were sifted into the dispersion ten minutes after caustic addition. Stirring and 80° C. temperature were maintained for an additional ten minutes.

The resulting paint had excellent characteristics with respect to viscosity stability, freeze-thaw stability, and washability.

We claim:

1. A method of making a viscosity stable latex comprising emulsion polymerizing 50–75 parts by weight of styrene with correspondingly 50–25 parts of butadiene and 0.25–2.0 parts of itaconic acid in about 100–150 parts of water containing 0.15–1.0 part of a water soluble persulfate catalyst and 2.8–11.4 parts of an emulsifier combination consisting of (a) 1.2–4.8 parts of a compound of the formula

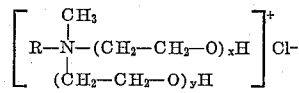

wherein R is derived from a mixture of myristic, lauric, palmitic, and stearic acids and $x$ and $y$ are integers the sum of which is about 15, (b) 0.4–1.8 parts of a compound of the formula

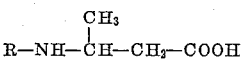

wherein R is as defined above, (c) 0.4–1.6 parts of a compound of the formula:

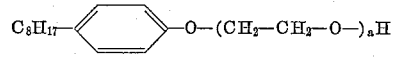

wherein $a$ is an integer having a value of from 9 to 10, and (d) 0.8–3.2 parts of a compound of the formula:

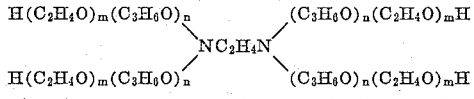

wherein $m$ and $n$ are integers having such values that the molecular weight of the compound is about 7,500–30,000.

2. A method of making a viscosity stable latex comprising polymerizing 50–75 parts by weight of styrene with correspondingly 50–25 parts of butadiene and 0.25–2.0 parts of itaconic acid in aqueous emulsion in the presence of 0.15–1.0 part of a water soluble persulfate catalyst and an emulsifier combination consisting of 1.2–4.8 parts of a polyethoxylated quaternary ammonium chloride formed by the addition of methyl chloride to a polyoxyethylated mono-omega-carboxyalkylamine wherein said carboxyalkyl radical is derived from a mixture of myristic, lauric, palmitic, and stearic acids, 0.4–1.8 parts of N-omega-carboxyalkyl-beta-aminobutyric acid wherein said carboxyalkyl radical is derived from a mixture of myristic, lauric, palmitic, and stearic acids, 0.4–1.6 parts of a polyethoxylated octyl phenol, and 0.8–3.2 parts of a block copolymer prepared by the sequential addition of propylene oxide and ethylene oxide to ethylene diamine.

3. In the emulsion polymerization of a monomeric mixture consisting essentially of 50–75 parts by weight of a styrene with correspondingly 50–25 parts of a butadiene and 0.25–2.0 parts of itaconic acid in aqueous emulsion in the presence of a water soluble persulfate catalyst, the improvement comprising polymerizing said monomeric mixture in the presence of an emulsifier combination consisting of 1.2–4.8 parts of a polyethoxylated quaternary ammonium chloride formed by the addition of methyl chloride to a polyoxyethylated mono-omega-carboxyalkylamine wherein said carboxyalkyl radical is derived from a mixture of myristic, lauric, palmitic, and stearic acids, 0.4–1.8 parts of N-omega-carboxyalkyl-beta-aminobutyric acid wherein said carboxyalkyl radical is derived from a mixture of myristic, lauric, palmitic, and stearic acids, 0.4–1.6 parts of a polyethoxylated octyl phenol, and 0.8–3.2 parts of a block copolymer prepared by the sequential addition of propylene oxide and ethylene oxide to ethylene diamine.

4. A viscosity stable latex for interior paints having high scrub resistance which comprises a terpolymer of 50–75 parts by weight of a styrene monomer with correspondingly 50–25 parts of a butadiene and 0.25–2.0 parts of an itaconic acid, said terpolymer being dispersed in 100–150 parts of water in the presence of an emulsifier combination consisting of 1.2–4.8 parts of a polyethoxylated quaternary ammonium chloride formed by the addition of methyl chloride to a polyoxyethylated mono-omega-carboxyalkylamine wherein said carboxyalkyl radical is derived from a mixture of myristic, lauric, palmitic, and stearic acids, 0.4–1.8 parts of N-omega-carboxyalkyl-beta-aminobutyric acid wherein said carboxyalkyl radical is derived from a mixture of myristic, lauric, palmitic, and stearic acids, 0.4–1.6 parts of a polyethoxylated octyl phenol, and 0.8–3.2 parts of a block copolymer prepared by the sequential addition of propylene oxide and ethylene oxide to ethylene diamine.

References Cited by the Examiner
UNITED STATES PATENTS

| | | | |
|---|---|---|---|
| 2,724,707 | 11/55 | Brown | 260—29.7 |
| 2,771,459 | 11/56 | Banes et al. | 260—29.7 |
| 2,888,444 | 5/59 | Roberts et al. | 260—29.7 |

OTHER REFERENCES

"Soap and Chemical Specialties," October 1955, page 61.

MURRAY TILLMAN, *Primary Examiner*.

LOUISE P. QUAST, *Examiner*.